United States Patent Office 3,516,957
Patented June 23, 1970

3,516,957
THERMOPLASTIC POLYESTER COMPOSITION CONTAINING ORGANIC ESTER MOLD RELEASE AGENT
Theodore F. Gray, Jr., and Max L. Carroll, Jr., Kingsport, Tenn., assignors to Eastman Kodak Company, Rochester, N.Y., a corporation of New Jersey
No Drawing. Filed Apr. 29, 1968, Ser. No. 725,205
Int. Cl. C08g *17/40, 39/02*
U.S. Cl. 260—22        10 Claims

ABSTRACT OF THE DISCLOSURE

Thermoplastic composition comprising a linear crystallizable polyester having a melting point above about 150° C., e.g. poly(ethylene terephthalate), poly(1,4-cyclohexanedimethylene terephthalate), or poly(1,4-butylene terephthalate), and a small percentage of an ester of an organic acid having from to 10 to 27 carbon atoms and an alcohol having from 1 to 10 carbon atoms, e.g. methyl stearate or pentaerythritol tetrastearate. Articles molded from the thermoplastic composition release quite readily from the mold or shaping surface during consecutive molding cycles. Such articles have good surface characteristics which are especially smooth when the composition contains a small percentage of a nucleating agent. Uniform surfaces gloss of molded articles is achieved by the conjoint presence of a synergistic agent such as an alkali metal salt or alkaline earth metal salt of an organic acid having 10 to 25 carbon atoms, e.g. sodium stearate; talc and asbestos are also synergistic agents. The thermoplastic compositions and molded articles can advantageously contain up to 50% by weight of glass fibers based on the total weight of the admixture.

---

This invention relates to thermoplastic linear crystallizable polyester compositions containing a release agent so as to facilitate forming a shaped article in contact with a shaping and cooling surface such as a mold. Glass fibers can be advantageously included in such compositions. The invention also relates to improved surface characteristics of the shaped articles especially when the thermoplastic polyester composition also contains a nucleating agent, or most preferably a synergistic agent, whereby a smooth surface having uniform gloss can be obtained.

The state of the art relating to molding compositions of thermoplastic polyesters which are high-melting linear crystallizable polyesters is at a relatively early stage. This is in distinct contrast to the rather advanced state of the art relating to thermosettable non-linear non-crystallizable polyesters which have found many uses, especially when reinforced with glass fabric, and many shaped objects can be formed including boat hulls, automobile bodies, construction panels, housings for machinery, etc.

The thermoplastic linear polyesters do not cross link upon heating, and those of particular utility for use in molding compositions generally have a melting point above about 150° C. and are crystallizable at temperatures above their second order transition temperature. It is this tendency to crystallize which has created a considerable problem in forming shaped objects or molded articles made by compression, transfer or injection molding, including extrusion molding whereby the articles so molded have thicknesses which are normally substantially greater than 10 mils, e.g. as construction panels, refrigerator doors, pipes, rods, automobile panels, sheeting, etc. Such molded objects do not include those which have a very small dimension such as fibers and thin film.

When shaped objects having substantial thickness are molded from linear thermoplastic crystallizable polyesters, the appearance of the article being formed as well as its properties tend to become non-uniform and distorted due to variations in the degree of crystallinity, whereby the article may become warped or distorted and the surface may be rough in some places and have other non-uniform characteristics. Even where the surface is smooth it may have a streaked appearance. In fact, it is quite difficult to mold such high-melting linear crystallizable polyesters even when they contain a reinforcing material such as glass fibers along with a crystallization nucleating agent which reduces variations in the degree of crystallinity in the article.

Such difficulties have been partially overcome by the prior art illustrated by U.S. Pat. 3,368,995 patented Feb. 13, 1968, which appears to indicate that the combination of glass fibers and a nucleating agent is essential to produce a useful crystallizable linear poly(ethylene terephalate) thermoplastic molding composition capable of being shaped into useful articles.

British Pat. 1,010,043 published Nov. 17, 1965, which corresponds to French Pat. 1,361,439 issued Apr. 13, 1964, teaches that polyesters which are thermoplastic can advantageously be admixed with glass fibers or other mineral fibers whereby articles prepared by molding have improved dimensional stability, a higher degree of hardness, and a reduced coefficient of thermal expansion along with improvement in heat distortion temperature under load, elastic modulus, and rigidity. According to these British and French patents, molding compositions of thermoplastic polyesters and the like can include pigments, stabilizers, antioxidants, matting agents, plasticizers, lubricants, loading agents, and other ingredients or additives as more specifically illustrated in working examples wherein graphite powder, titanium dioxide or the like are included in the molding composition along with glass fibers whereby molded objects of good physical properties can be obtained. However, no recognition is given to the problems associated with mold release and surface characteristics.

U.S. Pat. 2,877,501 issued Mar. 17, 1959, discloses in Example 6 a thermoplastic polyester molding resin which is not actually a linear polyester of the crystallizable type inasmuch as it is designated as a catalyzed polyester which is of the type which forms a highly cross-linked molecular structure. This Example 6 refers to the presence of a mold lubricant along with a coloring agent and plasticizer in the molding plastic mixture. No indication of the problems concering crystallizable linear polyesters is set forth.

The prior art as disclosed in Netherlands patent publications 6,608,999 dated Feb. 27, 1967, and 6,515,106 also dated Feb. 27, 1967, discloses polyesters of the linear crystallizable thermoplastic type which include additives which are of interest to those concerned with the state of the art in this field. For example, the additives which are disclosed include dinonyl phthalate. However, as noted in the data tabulated below, such an additive is not useful in accordance with the present invention.

The state of the art regarding shaping thermoplastic linear crystallizable polyesters does not at the present time include means for providing good release for the shaped article from the cooling surface of the mold or the like whereby the molded article will have a smooth surface. In addition to the problems associated with a rough surface, the present state of the art does not provide any means for avoiding streaking in the areas of the surface that are smooth, especially when reinforced with glass fibers. Surface roughness and non-uniform gloss are therefore serious problems which impair the commercial development of the art related to thermoplastic linear crystallizable polyester molded and shaped articles including sheets having substantial thickness.

One reason why the state of the art has been slow to develop is due to the fact that mold lubricants which are known in the art and have been useful in other thermoplastic compositions are in most instances useless when incorporated in a linear crystallizable high-melting polyester. This is quite well illustrated in the tables of data given hereinbelow wherein a number of relatively useless additives are included for the purpose of illustrating the advance in the art represented by the present invention.

Another patent which illustrates the state of the art is U.S. 2,649,622 patented Aug. 25, 1953, wherein a process is disclosed for molding articles from linear poly(ethylene terephthalate) under conditions whereby the material crystallizes to form a molded article. It is said that the polymer may be extended by mixing it with fillers as well as a wide variety of plasticizers, waxes, lubricants, heat stabilizers and pigments. However, during the time since this patent issued in 1953, there has not been any substantial commercial production of molded thermoplastic crystallizable polyester articles due to the difficulties already explained herein before.

U.S. Pat. 2,532,245 issued Nov. 28, 1950, teaches the use of lithium stearate alone or in combination with pentaerythritol monostearate as a flow agent for polymers and copolymers of vinylidene chloride. Such polymers are not crystallizable as molded articles and there is no analogy between the concept of providing a useful flow agent and the present invention which concerns surface release from a mold and the problem of roughness and gloss of the surface obtained. Other prior art such as U.S. 2,128,534 issued Aug. 30, 1938, U.S. 2,357,833 issued Sept. 12, 1944, and many other patents describe the use of various mold lubricants or release agents in molding compositions. It is not considered worthwhile to review the many other patents which would suggest to those skilled in the art possible mold release agents which could be included in molding compositions. It is only worthy of emphasis to indicate that the number of such compounds which might seem to be available for experimentation is quite astronomical in magnitude. There are no guidelines for selection by those of ordinary skill in the art which would lead them to the present invention.

It is now been found that certain precisely defined esters of certain organic acids, and certain alcohols can be incorporated in a thermoplastic linear crystallizable high-melting polyester whereby articles can be shaped from the hot composition in contact with a cooling surface adapted to form a shaped article, and the forming of such shaped articles can be repeated in consecutive cycles depending essentially upon said organic ester to provide complete release from the cooling surface.

This invention or discovery permits consecutive molding or the like of a plurality of articles without need for treating the mold by spraying with a mold lubricant or the like, and therefore overcomes another problem frequently encountered in the molding industry which requires excessive attention by skilled operators stationed with the molding machinery which is therefore not capable of producing its maximum output.

A principal object of the invention is to provide the advantages mentioned above and more clearly explained hereinbelow thereby largely overcoming the problems which have been discussed herein. The objects of the invention include providing new thermoplastic linear crystallizable high-melting polyester compositions capable of being shaped into useful articles which are readily released from the shaping surfaces and have substantially smooth surfaces of uniform gloss.

Another object of this invention is to provide such improved thermoplastic linear crystallizable polyester compositions which include fibers of inorganic materials, especially glass fibers. An additional object is to provide such thermoplastic compositions containing glass fibers, release agents, nucleating agents and/or synergistic agents which improve the smoothness of the surface as well as the gloss and uniformity of the gloss of the surface of shaped articles containing glass fibers.

Other objects and advantages are apparent elsewhere in this specification.

According to one embodiment of the present invention there is provided a thermoplastic polyester composition comprising a linear polyester having a melting point above about 150° C. and a second order transition temperature above about 0° C. and from about 0.1 to about 3% by weight, based on the polyester content, of an ester of an organic acid and an alcohol, said organic acid being essentially composed of a hydrocarbon group having from about 9 to about 25 carbon atoms and one or two carboxyl groups, each being attached to a quaternary carbon atom, and said alcohol being essentially composed of a hydrocarbon group having from about 1 to about 10 carbon atoms and from 1 to 4 hydroxy groups, each being attached to a quaternary carbon atom.

Advantageously the ester has a boiling point above about 200° C. measured at one atmosphere pressure. It is also advantageous to employ such esters wherein the alcohol component contains a quaternary carbon atom in the $\beta$ position with respect to each hydroxy group, said quaternary carbon atom being preferably attached only to other carbon atoms.

According to another embodiment of this invention there is provided a thermoplastic composition as described above wherein said composition contains from about 0.1 to about 3% by weight, based on the polyester content, of a nucleating agent.

According to an additional embodiment of this invention there is provided a thermoplastic composition as described above wherein said composition contains from about 0.1 to about 3% by weight, based on the polyester content, of a synergistic agent selected from the group consisting of:

(a) Alkali metal salts and alkaline earth metal salts of an organic acid essentially composed of a hydrocarbon group containing from about 9 to about 25 carbon atoms and a carboxyl group attached to a quaternary carbon atom, (b) Talc, and (c) Asbestos.

The latter thermoplastic compositions in especially advantageous embodiments contain as the organic ester, either methyl stearate or pentaerythritol tetrastearate, and also contain, as the synergistic agent, sodium stearate.

According to an especially preferred embodiment of this invention there is provided a thermoplastic composition as described above wherein said composition is uniformly admixed with up to about 50% by weight, based on total weight of the admixture, of glass fibers having fiber lengths in the range between about 0.4 and about 20 mm.

According to an additional embodiment of this invention there is provided molded articles of the thermoplastic compositions described hereinabove. Such molded articles are especially preferred wherein the surface of such articles is substantially smooth and has a uniform gloss due to the presence of the above described synergistic agents.

The molded articles prepared in accordance with one embodiment of this invention can be substantially amorphous or they can be substantially crystalline depending upon the process for forming the articles.

According to another embodiment of this invention there is provided a process for forming a shaped article comprising:

(1) Plasticating a thermoplastic composition according to this invention at a temperature above the melting point of the said polyester contained therein, (2) Shaping said thermoplastic composition in contact with a cooling surface adapted to form a shaped article having a temperature below the melting point of said polyester, (3) Holding under said shaping and cooling conditions for a contact period of 0.05 to 10 minutes, (4) Removing said shaped article from said cooling surface, and (5) Repeating steps (2) and (3) in consecutive cycles depending essentially upon said ester to provide complete release from said cooling surface.

Such a process can be advantageously performed for at least 15 cycles without any need for the employment of a separate mold release agent unless the part being molded is of unusual complexity. In fact, hundreds of cycles can be performed when the molded article is relatively simple in shape.

According to a further embodiment of this invention there is provided a process as described above wherein said cooling surface temperature is in the range between about 120° C. and about 200° C. when said polyester is poly(ethylene terephthalate) or poly(1,4-cyclohexanedimethylene—80 to 100% terephthalate—0 to 20% isophthalate).

According to another embodiment of this invention there is provided a process as described above wherein said cooling surface temperature is in the range of between about 0° C. and about 30° C. when said polyester is poly(ethylene terephthalate) or poly(1,4-cyclohexanedimethylene—80 to 100% terephthalate—0 to 20% isophthalate).

The molded articles prepared in accordance with this invention have substantially smooth surfaces and when such molded articles contain a nucleating agent they generally are characterized by very little roughness.

In accordance with an especially preferred embodiment of this invention, the molded articles which contain an ester release agent and a synergistic agent as described above and are characterized by essentially no roughness.

As mentioned hereinabove, the amounts of organic ester release agent are advantageously in the range of from about 0.1% to about 3%. However, even more advantageously this range is between about 0.3% and about 0.7%. The same especially advantageous ranges are also useful for the nucleating agent and/or synergistic agent or agents. The amount of glass fiber which can be advantageously employed is any amount up to 50% as mentioned hereinabove. However, it is especially advantageous, when such glass fibers are employed, to have the range between about 10% and about 35%.

The range of carbon atoms in the organic acid as mentioned above is advantageously between about 10 and 26 carbon atoms; however, an especially advantageous range is from about 16 to 22 carbon atoms. The generally advantageous range of carbon atoms in the alcohol, as mentioned above, is from about 1 to about 10 carbon atoms; however, this range is especially advantageous between about 1 and about 7 carbon atoms.

The linear crystallizable, high-melting thermoplastic polyesters which can be employed in accordance with the present invention have been more specifically identified hereinabove and are further illustrated in the examples given hereinbelow. Reference is also made to the prior art describing such polyesters (which include copolyesters) as described in U.S. 2,465,319 and in U.S. 2,901,466. Of course, many other patents are available which disclose other species of such polyesters and are to be found in the files of the U.S. Patent Office under the classification of synthetic resins, polyhydric alcohol-polycarboxylic acid reaction products. There is obviously no need to give any further detailed list of such species which are well known to those having ordinary skill in the art.

The inherent viscosity values referred to in the present specification are measured at a concentration of 0.23% by weight of the polyester dissolved in a solvent composed of 60 parts of phenol and 40 parts of tetrachloroethan at about 25° C.

The ester of an organic acid and an alcohol which serves as release agent is advantageously present as an intimate blend with the polyester, but this blend need not necessarily be completely homogeneous. In other words, the polyester can be in the form of pellets having on the surface thereof a coating of the release agent whereby the coated pellet, including the coating, has a given amount of the release agent present as set forth in the range of percentages given hereinbelow. Of course, these pellets can be melted and the release agent completely blended homogeneously in the melt and then repelleted. The same applies to the nucleating agent and/or synergistic agent which can also be present as a coating on polyester pellets. As another alternative, the release agent and/or nucleating agent and/or synergistic agent can be in the form of particles which are blended with pellets of the polyester. Likewise, the glass fibers can be present as a blend in the form of a binary mixture of glass fibers and pellets of the polyester, or the glass fibers can be distributed in a reasonably uniform manner throughout individual pellets of the polyester, or the glass fibers can be coated with the polyester in a uniform manner, or coated in a non-uniform manner such as when a bundle of glass fibers are coated primarily at the perimeter of the bundle with little of the polyester being present internally within the bundle of fibers. It is obvious that there are many other variations which can be employed in accordance with the present invention as will be obvious to those having ordinary skill in the art. For example, the release agent and/or nucleating agent and/or synergistic agent may be applied to the surface of the glass fibers, when such fibers are being employed, so that the molded articles obtained will have amounts thereof within the prescribed ranges of percentages. Such coatings can be obtained using solutions in some instances, or dispersions in other instances, or other techniques. When a solution is used, it is ordinarily advantageous to evaporate the solvent after the pellet coating operation has been completed.

Although the state of the art involving molding linear crystallizable thermoplastic polyesters is at a relatively early stage, there is nevertheless a sufficient disclosure in the references cited hereinabove so that it is unnecessary to indulge in a lengthy discussion of how such molding operations can be advantageously employed. This applies in particular to molding articles wherein the polyester is present in a substantially crystalline form. For example, when molding poly(ethylene terephthalate) or poly-(1,4 - cyclohexanedimethylene—83% of terephthalate—17% isophthalate) the temperature of the mold surfaces is advantageously in the range of from about 120° C. to about 200° C. at the same time the molten thermoplastic composition is introduced into the mold. Such a range is especially advantageous from about 135° to about 165° C. On the other hand, when the thermoplastic composition primarily contains poly(1,4-butylene terephthalate), the preferred temperature range is from about 23° to about 120° C. with the especially preferred range being from about 50° to about 110° C. When it is desired to obtain a molded article wherein the polyester is present in the substantially amorphous form, the mold surfaces are held at substantially below the second order transition temperature, such temperature being advantageously in the range of from about 0° to about 30° C.

As nucleating agents which can be employed in accordance with the present invention, those compounds and additives are included which are illustrated in the prior art, such as those patents listed hereinabove, as well as further illustrated by the oxides, sulfates, phosphates, silicates, oxalates, benzoates, and other inorganic and organic salts of those elements of the Periodic Table in Groups I-A, II-A, II-B, and III-A. Various compounds of elements of other groups of the Periodic Table can also be employed as will be apparent to those having ordinary skill in the art. Reference is directed to an article entitled "Crystallization-Modified Polypropylene" by C. J. Kuhre, M. Wales, and M. E. Doyle which begins on p. 1113 of the October 1964 issue of the SPE Journal. In general, it is recognized that nucleating agents which are useful for polypropylene and other crystallizable polymers will also be useful in linear crystallizable thermoplastic polyesters.

However, those salts which possess a synergistic function are not necessarily all of the salts which are useful a nucleating agents, but are limited to those which have been tested (or are closely analogous thereto) and found to give a synergistic result. These synergistic agents are specifically identified hereinabove and in the working examples set forth hereinbelow. Their behavior is synergistic in the sense that neither the release agent alone nor the synergistic agent alone is capable of yielding thermoplastic compositions which can be molded so as to obtain good mold release and smooth surfaces having uniform gloss. However, when these two agents are combined, a synergistic effect is obtained which is quite non-obvious to those having ordinary skill in the art.

It should be pointed out that the percentages of the release agent and synergistic agent and/or nucleating agent, as discussed hereinabove, are generally limited to a maximum of 3% of each based upon the weight of the polyester in the thermoplastic composition. However, this limitation is solely in regard to their function as release agent, or nucleating agent, or synergistic agent. Excessive amounts can also be present and merely serve as fillers for the thermoplastic composition. Therefore, the thermoplastic compositions of this invention are intended to include such compositions wherein such excessive amounts may be present, although it will be recognized that the presence of such fillers will generally diminish some of the valuable properties of the thermoplastic compositions as shaped articles.

To function effectively as a release agent during molding or shaping operations, such an agent must be stable at the process temperatures so that it will not loose its effectiveness and/or cause color, and must not chemically interact with the polymers which might cause degration or adversely affect the polymer. The above defined branched and linear esters of $C_{10}$–$C_{25}$ acids fulfill these prerequisites In addition, those esters with no $\beta$-hydrogen in the alcohol portion of the ester are especially stable in the 225–335° C. range.

The following table of useful organic esters is presented for further illustrative purposes:

| Organic ester | Boiling point, ° C. | Pressure, mm. Hg. |
| --- | --- | --- |
| Caprate ($C_{10}$): | | |
| Methyl | 224 | 760 |
| n-Propyl | 129 | 10 |
| n-Decyl | 219 | 15 |
| Isopropyl | 121 | 10 |
| Laurate ($C_{12}$): | | |
| Methyl | 262 | 760 |
| n-Propyl | 124 | 2 |
| Isopropyl | 117 | 2 |
| Benzyl | 210 | 12 |
| Palmitate ($C_{16}$): | | |
| Methyl | 148 | 2 |
| n-Propyl | 166 | 2 |
| Stearate ($C_{18}$): | | |
| Methyl | 215 | 15 |
| n-Propyl | 187 | 2 |
| n-Butyl | 223 | 760 |
| 3-methyl butyl | 192 | 2 |
| Isobutyl | 223 | 15 |
| Behenate ($C_{22}$): | | |
| Methyl | 241 | 10 |
| Ethyl | 226 | 15 |
| Sebacate ($C_{10}$): | | |
| di-methyl | 144 | 5 |
| di-n-butyl | 344 | 760 |
| di-zethyl butyl | 345 | 760 |
| di-zethyl hexyl | 256 | 5 |
| Dodecanedioate ($C_{12}$), dimethyl | 150 | 2 |
| Octadecanedioate ($C_{18}$), diethyl | 240 | 12 |
| 2-phenyl butanoate ($C_{10}$), methyl | 228 | 760 |

The esters listed above which have boiling points below 200° C. at less than one atmospheric pressure will be readily recognized as having boiling points above 200° C. when the pressure is at one atmosphere (760 mm. of Hg pressure).

The synergistic action between an organic ester release agent and a nucleating agent and/or synergistic agent in providing good mold release and improved surface appearance is not completely understood. It appears that the organic ester provides most of the release function and the combination, perhaps partly due to nucleation, yields improved surface finish. This explanation is not completely satisfactory since some combinations do not apparently nucleate the polyesters. In other words, the synergistic agents are not necessarily nucleating agents. Hence, the inventors do not wish to be limited by any hypothetical speculation and the discovery or invention which they have made is considered quite nonobvious.

A synergistic combination, for example, 0.5 wt. percent sodium stearate +0.5 wt. percent pentaerythritol tetrastearate in poly(ethylene terephthalate) which contains 20 wt. percent of glass fiber, allows the molding of salad bowls continuously without externally spraying the mold with lubricant and yields a salad bowl with a smooth surface and uniform gloss. The continuous operation is important for automated injection molding and the good surface appearance allows painting, if desired, without further preparation to smooth the surface.

Another synergistic combination, for example, 0.5 wt. percent sodium stearate +0.5 wt. percent pentaerythritol tetrastearate in poly(ethylene terephhalate) having an inherent viscosity of 0.61 allows continuous molding, with a 45 sec. cycle time, of tensile bar specimens without spraying the mold surface with lubricant. However, in the absence of this synergistic combination the mold has to be sprayed excessively, such as every 4–6 cycles so as to prevent sticking.

By employing a mold release agent according to this invention, for example, 0.5 wt. percent methyl stearate in poly(ethylene terephthalate) containing 20 wt. percent glass fiber based on the total weight of the admixture, it is feasible to mold salad bowls without mold spraying whereas in the absence of such release agent as provided by this invention, the mold has to be sprayed every 2–4 cycles with one of the normally available commercial mold lubricants.

According to one aspect of this invention, as also discussed above, it has been found that poly(ethylene terephthalate), as known in the prior art, is difficult to injection or compression mold even when it contains glass fibers, especially if the desired molded article is to be molded at elevated temperature so that it will crystallize thereby increasing the upper temperature limit at which the article can be used from near the glass transition temperature to near the melting point. Such difficulty arises in that the molded article tends to stick in the mold and thus interrupts the mold cycle and/or the article is damaged during ejection; and, moreover, the surface finish of the article is rough in spots and the surface gloss is streaked.

First, as also discussed above, it was discovered that out of numerous mold release agents tested, only those provided by this invention, e.g. pentaerythritol tetrastearate and methyl stearate, or the like, were capable of providing continuous mold cycles without externally spraying the mold or frequently stopping the cycle to remove the stuck molded article. These mold release agents can be incorporated internally or coated on the reinforced (using glass fibers or the like) or nonreinforced poly (ethylene terephthalate) (or similar polyesters) molding material in concentration from 0.1 to 3 percent, but preferably are used in the 0.3–0.7 percent range.

Second, as also discussed hereinabove, it was found that poly(ethylene terephthalate) by itself or with pentaerythritol tetrastearate, methyl stearate, or the like, when molded has rough spots spread over the molded surface and dull streaks scattered over the surface. Hence, it was found quite unexpectedly that combinations of talc, asbestos, or certain metal salts of stearic acid with pentaerythritol tetrastearate, methyl stearate, or the like, improve the surface finish markedly and also provide excellent mold release. The specifically named additives can be used along with or replaced by other agents as described more fully herein.

What makes the discovery so unexpected is illustrated by the fact that while pentaerythritol tetrastearate and methyl stearate provide good mold release, nevertheless molded articles have rough surface finishes; whereas, a synergistic agent (for example, sodium stearate) does not provide good mold release and leaves surface imperfections and dull streaks in the surface. However, when the organic ester release agent and the synergistic agent (e.g. sodium stearic, talc or asbestos) are combined even at combined concentrations below that of one component used by itself, the surface finish is improved and mold reelase is good. A further indication that the invention is nonobvious is that even nonreinforced poly(ethylene terephthalate), with an inherent viscosity of 0.5 to 0.6, containing the synergistic combination of agents can be molded using a 140–150° C. mold temperature with low cycle times of 40–50 seconds so as to produce good quality articles, whereas without the synergistic combination cycle times of 70–100 seconds are required and the articles obtained are substandard. This was completely unexpected since a recent U.S. Pat. 3,368,995 (column 12, lines 66–71) indicates that non-reinforced poly(ethylene terephthalate) with a nucleating agent cannot ordinarily be molded satisfactorily to give a commercially acceptable molded article.

Hence it is another object and advantage of this invention to provide a shaping or molding process wherein the shaping time period in contact with a cooling surface is substantially reduced (e.g. by 25 percent or more) without adversely affecting the quality of the shaped article being formed.

It has been found that the enhanced mold release and surface appearance obtained by incorporation of the synergistic combination of agents does not reduce the excellent physical properties of the reinforced and non-reinforced poly(ethylene terephthalate) or similar polyesters as might have been expected since dilution of a polymer with other components generally results in a reduction of some desirable property or properties.

A further object of this invention is to provide release agents, nucleating agents and/or synergistic agents, which avoid deleterious discoloration of shaped articles formed from linear crystallizable thermoplastic polyesters containing such agents. This objective is especially important with regard to transparent, white, or lightly colored articles including sheeting, tubes, molded parts where appearance is important, etc. The release agents of this invention in synergistic combination with the Group I–A metal salts provide outstanding results.

When glass fibers are in admixture with the thermoplastic linear crystallizable polyester, the shaped articles formed from the admixture have an especially significant need for the advantages provided by the present invention inasmuch as the presence of glass fibers otherwise aggravates the problems of mold release, surface roughness and uniformity of gloss. Hence, the advantages of the invention are especially important when glass fibers are present in the shaped articles.

The following examples will serve to further illustrate this invention.

EXAMPLE 1

The mold release agents listed in Table 1 are dry blended in poly(ethylene terephthalate) having an inherent viscosity of 0.61 determined at 25° C. in 60:40 weight to weight ratio of phenol and tetrachloroethane in which the polymer concentration is 0.23 weight percent. The composition is melt extruded at 270° C. as a rod into a bath of water maintained at a temperature of 23° C. Pellets suitable for molding are chopped or granulated from the rod and dried under vacuum at 150° C. for six hours. The dried pellets are then injection molded into standard Type 1, 0.125 inch thick tensile bars as described in ASTM D638–60T on a six ounce reciprocating screw machine, the cylinder temperatures of which are adjusted to give a melt temperature of 275° C. at the nozzle. The tensile bar mold is maintained at a temperature of 145° C. and the cycle time is 68 seconds. A silicone mold release agent is sprayed thoroughly into the mold and tensile bars are molded until one sticks in the mold and has to be removed manually. In addition the effect of the blended mold release agent on the color of the material of the tensile bars is also noted. A good mold release agent will not substantially discolor the molded material and will enable a number of molding cycles to be performed before sticking occurs.

TABLE 1

| Sample: | Mold release additive | Weight percent additive | Number of cycles before sticking occurs | Color of molded tensile bars |
|---|---|---|---|---|
| 1 | None | 0 | 4 | White. |
| 2 | Calcium stearate | 0.5 | 6 | Ivory. |
| 3 | Triphenyl phosphate | 0.5 | 6 | White. |
| 4 | Di-2-ethylhexyl phthalate | 0.5 | 6 | Do. |
| 5 | Armid O[1] | 0.5 | 7 | Brown. |
| 6 | Zinc stearate | 0.5 | 8 | Yellowish-tan. |
| 7 | Armour PE 210[2] | 0.5 | 9 | Brown. |
| 8 | Sonopole A[3] | 0.5 | 9 | Tan. |
| 9 | Hodag Wax[4] | 0.5 | 11 | Do. |
| 10 | Adogen 58[5] | 0.5 | 12 | Brown. |
| 11 | Petro 250[6] | 0.5 | 12 | Tan. |
| 12 | Kenamide S[7] | 0.5 | 12 | Brown. |
| 13 | Stearic acid | 0.5 | 15 | Yellowish-white. |
| 14 | Neopentyl glycol distearate | 0.5 | 16 | White. |
| 15 | n-Butyl stearate | 0.5 | 17 | White (slight grayish cast). |
| 16 | Methyl stearate | 0.5 | 18 | White. |
| 17 | Iso-butyl stearate | 0.5 | 18 | Do. |
| 18 | n-Decyl stearate | 0.5 | 20 | White (slight grayish cast). |
| 19 | 1,1,1-trimethylolethane tetrastearate | 0.5 | 22 | White. |
| 20 | Pentaerythritol tetrastearate | 0.5 | 24 | Do. |
| 21 | Methyl stearate | 1.5 | 40 | Smooth, uniform, glossy, white. |
| 22 | Pentaerythritol tetrastearate | 1.5 | 40 | Do. |

[1] An unsaturated fatty amide.
[2] An unsaturated fatty amide.
[3] A polyoxyethylene stearic acid ester.
[4] A synthetic wax insoluble in water and soluble in hot toluol.
[5] An unsaturated fatty amide.
[6] An anionic compound having mold release properties.
[7] A saturated fatty amide.

The additives of Samples 14–22 are seen to be more satisfactory mold release agents than the additives of Samples 2–13 since more cycles can be performed before sticking occurs and less discoloration of the molded part is observed.

EXAMPLE 2

Tensile bars are injection molded under the conditions set forth in Example 1 (melt temperature 275° C., mold temperature 145° C., cycle time 68 sec.) but from poly-(ethylene terephthalate) pellets (inherent viscosity of 0.61) dry blended with 0.5 weight percent of 1,1,1-trimethylolethane tristearate as a mold release agent. The color of the molded tensile bars is white and 19 molding cycles are completed before sticking occurs.

rod and dried under vacuum at 150° C. for six hours. The dried pellets are then injection molded into standard ASTM tensile bars on a six ounce reciprocating screw machine, the cylinder temperatures of which are adjusted to give a melt temperature of about 304° C. at the nozzle. The tensile bar mold is maintained at a temperature of 150° C. and the cycle time is 78 seconds. A silicone mold release agent is sprayed thoroughly into the mold and tensile bars are molded until one sticks in the mold and has to be removed manually. In addition the effect of the blended mold release agent on the color of the material of the tensile bars is also noted. A good mold release agent will not substantially discolor the molded material and will enable a number of molding cycles to be performed before sticking occurs.

TABLE 2

| Sample: | Mold release additive | Weight percent additive | Number of cycles before sticking occurs | Color of molded tensile bars |
|---|---|---|---|---|
| 1 | None (Control) | 0 | 3–5 | White, cream. |
| 2 | Triphenyl phosphate | 0.5 | 5 | White. |
| 3 | Di-2-ethylhexyl phosphate | 0.5 | 6 | Whitish tan. |
| 4 | Calcium stearate | 0.5 | 8 | Yellowish tan. |
| 5 | Armour PE 210 | 0.5 | 8 | Brown. |
| 6 | Adogen 58 | 0.5 | 8 | Do. |
| 7 | Petro 250 | 0.5 | 9 | Brownish cream. |
| 8 | Sonopole A | 0.5 | 9 | Dark brown. |
| 9 | Stearic acid | 0.5 | 9 | Yellowish tan. |
| 10 | Zinc stearate | 0.5 | 10 | Tannish ivory. |
| 11 | Armid-O | 0.5 | 11 | Dark brown. |
| 12 | Kenamide S | 0.5 | 12 | Brown. |
| 13 | Hodag wax | 0.5 | 12 | Tannish brown. |
| 14 | Neopentyl glycol distearate | 0.5 | 15 | Ivory. |
| 15 | n-Butyl stearate | 0.5 | 17 | White (slight tan tint). |
| 16 | n-Decyl stearate | 0.5 | 18 | Do. |
| 17 | 1,1,1-trimethylolethanetristearate | 0.5 | 18 | White. |
| 18 | Penterythritol tetrastearate | 0.5 | 18 | Do. |
| 19 | Iso-butyl stearate | 0.5 | 19 | Cream. |
| 20 | Methyl stearate | 0.5 | 20 | White. |

EXAMPLE 3

The exact procedure of Example 1 is followed except that 0.9 weight percent of methyl stearate is dry blended with poly(ethylene terephthalate) having an inherent viscosity of 1.1 and the cycle time is 75 sec. The color of the molded tensile bars is white and 38 molding cycles are performed without sticking of the molded part.

EXAMPLE 4

The compositions of Sample 21 and 22 of Table 1 are molded following the exact procedure of Example 1 except the cycle time is 32 seconds and the mold temperature is maintained at 10° C. with the result that the material of the molded tensile bars remains amorphous rather than becoming crystalline as in the previous examples. Forty-eight cycles are completed with bars molded from each composition without occurance of part to mold stickage. The molded bars are slightly amber in color and are transparent.

EXAMPLE 5

The mold release agents listed in Table 2 are dry blended in poly(1,4 - cyclohexanedimethylene terephthalate) having an inherent viscosity of 0.86. The composition is melt extruded at 306° C. as a rod into a bath of water maintained at a temperature of 23° C. Pellets suitable for molding are chopped or granulated from the The additives of Samples 14–20 are seen to be more satisfactory mold release agents than the additives of Samples 2–12 since more cycles can be performed before sticking occurs and less discoloration of the molded part is observed.

EXAMPLE 6

Tensile bars are molded using the exact procedure of Example 5 except that the mold release agent is 1.5 weight percent of pentaerythritol tetrastearate blended into the thermoplastic poly(1,4-cyclohexanedimethylene terephthalate) having an inherent viscosity of 1.2. Further, the injection molding cycle time is 72 seconds. The color of the molded bars is white and 34 cycles are completed without sticking.

EXAMPLE 7

Pellets of poly(1,4 - cyclohexanedimethylene terephthalate) modified in that 17 mole percent of the terephthalate is replaced by isophthalate, which is a moldable thermoplastic polyester having an inherent viscosity of 1.02, are coated by tumbling with powdered pentaerythritol tetrastearate as a mold release agent to obtain a weight percentage of 1.5% of this agent, based on the weight of the polyester. This composition is molded into tensile bars using the exact procedure of Example 5 except that the melt temperature is 290° C. Tensile bars of white color are obtained and 34 molding cycles are completed without sticking.

EXAMPLE 8

The mold release agents listed in Table 3 are dry blended with poly(ethylene terephthalate) having an inherent viscosity of 0.60. Pellets are formed from this composition by extrusion at 270° C. in rod form into a water bath maintained at a temperature of 23° C. and thereafter chopping or granulating the rod into pellets which are dried under vacuum at 150° C. for six hours. These pellets are again extruded at a melt temperature of 285° C. through a crosshead extruder to coat the polymer onto a continuous glass fiber (silane sized roving of 60 ends, 204 filaments per end. The polymer coated roving is passed through a 23° C. water bath and then chopped into glass filled pellets ⅜ inch long. These pellets contain an admixture of 20 weight percent glass fiber, based on the weight of the admixture, except Samples 21 and 22 which contain 10 and 40 weight percent, respectively, the remainder of the admixture being poly(ethylene terephthalate) having an inherent viscosity of 0.55 and additives as indicated. The percentages of additives are based upon the polyester content alone, and not the total admixture. This mixture is dried for six hours at 150° C. under vacuum and then injection molded into standard tensile bars on a six ounce reciprocating screw machine the cylinder temperature of which are adjusted to give a melt temperature of 275° C. at the nozzle. The tensile bar mold is maintained at a temperature of 145° C. and the cycle time is 55 seconds for Samples 1–20 and 58 seconds for Samples 21 and 22. A silicone mold release agent is sprayed thoroughly into the mold and tensile bars are molded until one sticks in the mold and had to be removed manually. In addition the effect of the blended mold release agent on the color of the material of the tensile bars is also noted. A good mold release agent will not substantially discolor the molded material and will enable a number of molding cycles to be performed before sticking occurs.

TABLE 4

| Sample: | Tensile break strength, ASTM D638, p.s.i. | Flexural modulus, ASTM D790, p.s.i. |
|---|---|---|
| 1 | 20,700 | $1.07 \times 10^6$ |
| 20 | 20,100 | $1.15 \times 10^6$ |

These data indicate no significant change in properties due to the addition of pentaerythritol tetrastearate.

EXAMPLE 9

The exact procedure of Example 1 is followed except that pellets of poly(ethylene terephthalate) having an inherent viscosity of 0.8 and containing 1.0 weight percent pentaerythritol tetrastearate are mechanically blended with ¼ inch chopped strand glass fiber coated with a silane sizing to give a mixture containing 20% by weight glass fibers based on the total weight of the admixture. A molding cycle time of 55 seconds is used and 45 cycles are performed without sticking between the mold and tensile bars. The color of the bars is white.

EXAMPLE 10

The exact procedure of Example 8 is followed except that the molding composition is poly(1,4-cyclohexanedimethylene terephthalate) having an inherent viscosity of 0.80 blended with pentaerythritol tetrastearate to provide 0.7 weight percent of this mold release agent and the extrusion temperatures are 300° C. The pellets contain 20% by weight glass, based on total weight, and are injection molded using a 61 second cycle time. The molded tensile bars are white and more than 35 cycles are performed without sticking.

TABLE 3

| Sample: | Mold release additive | Wt. percent glass | Wt. percent additive | Number of cycles before sticking occurs | Color of molded tensile bars |
|---|---|---|---|---|---|
| 1 | None (Control) | 20 | 0.5 | 2 | Cream. |
| 2 | Triphenyl phosphate | 20 | 0.5 | 3 | White. |
| 3 | Di-2-ethylhexyl phthalate | 20 | 0.5 | 4 | Cream. |
| 4 | Zinc stearate | 20 | 0.5 | 5 | Yellowish-cream. |
| 5 | Calcium stearate | 20 | 0.5 | 5 | Do. |
| 6 | Hodag wax | 20 | 0.5 | 8 | Tannish brown. |
| 7 | Adogen 58 | 20 | 0.5 | 8 | Tan. |
| 8 | Armid-O | 20 | 0.5 | 9 | Light brown. |
| 9 | Armour PE 210 | 20 | 0.5 | 9 | Brown. |
| 10 | Sonopole A | 20 | 0.5 | 10 | Tannish brown. |
| 11 | Petro 250 | 20 | 0.5 | 11 | Ligt tan. |
| 12 | Kenamide S | 20 | 0.5 | 12 | Brown. |
| 13 | Stearic acid | 20 | 0.5 | 12 | Cream. |
| 14 | n-Butyl stearate | 20 | 0.5 | 14 | White (tan tint). |
| 15 | n-Decyl stearate | 20 | 0.5 | 14 | Do. |
| 16 | Neopentyl glycol distearate | 20 | 0.5 | 16 | White. |
| 17 | Iso-butyl stearate | 20 | 0.5 | 17 | Cream. |
| 18 | Methyl stearate | 20 | 0.5 | 19 | White. |
| 19 | 1,1,1-trimethylolethane tristearate | 20 | 0.5 | 19 | Do. |
| 20 | Pentaerythritol tetrastearate | 20 | 0.5 | 22 | Do. |
| 21 | do | 10 | 1.0 | >35 | Do. |
| 22 | do | 40 | 1.0 | >35 | Do. |

The additives of Samples 14–22 are seen to be more satisfactory mold release agents than the additives of Samples 2–13 since more cycles can be performed before sticking occurs and less discoloration of the molded part is observed.

Certain properties of the tensile bars of Samples 1 and 20 are compared and the results listed in Table 4:

EXAMPLE 11

The exact procedure of Example 1 is repeated except the additives are those listed in Table 5 which are added to provide 1.0 weight percent and the cycle time is 55 seconds. The effectiveness of the additive is evaluated on ease of release from the mold and the appearance of the molded tensile bar.

TABLE 5

| Additive | Mold release | Bar appearance |
|---|---|---|
| 1. None (Control) | Generally sticks in less than 3 cycles and will not eject. | Distorted and warped. |
| 2. Talc | Generally sticks in less than 10 cycles and is difficult to eject in most instances. | Some distortion. |
| 3. Titanium dioxide | do | Do. |
| 4. Magnesium oxide | do | Do. |
| 5. Magnesium sulfate | do | Do. |
| 6. Sodium sulfate | do | Do. |
| 7. Aluminum sulfate | do | Do. |
| 8. Calcium benzoate | do | Do. |
| 9. Sodium benzoate | do | Do. |
| 10. Magnesium silicate | do | Do. |
| 11. Zinc salicylate | do | Do. |
| 12. Calcium tartrate | do | Do. |
| 13. Calcium phosphate | do | Do. |
| 14. Lithium stearate | do | Do. |
| 15. Sodium stearate | do | Do. |
| 16. Calcium stearate | do | Do. |
| 17. Aluminum stearate | do | Do. |
| 18. Sodium laurate | do | Do. |
| 19. Lithium palmitate | do | Do. |
| 20. Aluminum behenate | do | Do. |
| 21. Zinc stearate | do | Do. |
| 22. Asbestos | do | Do. |
| 23. Methyl stearate | Generally releases during more than about 15 consecutive cycles, but bars are limber. | Warped and distorted. |
| 24. n-Butyl stearate | do | Do. |
| 25. n-Decyl stearate | do | Do. |
| 26. Isobutyl stearate | do | Do. |
| 27. Pentaerythritol tetrastearate | do | Do. |
| 28. Neopentyl glycoldistearate | do | Do. |
| 29. 1,1,1-triethylolethane tristearate | do | Do. |
| 30. n-Butyl laurate | do | Do. |
| 31. Methyl behenate | do | Do. |
| 32. Pentaerythritol tetrapalmitate | do | Do. |

It is seen that the additives of Sample Nos. 2–22 are not very useful in improving mold release or in eliminating bar distortion. The additives of Sample Nos. 23–31 improve mold release but the bars are warped.

EXAMPLE 12

The exact procedure of Example 1 is repeated except that the additives are a synergistic combination of components as listed in Table 6 and the cycle time is 55 seconds.

TABLE 6

| Additive | Mold release | Bar appearance |
|---|---|---|
| 1. 0.5 wt. percent methyl stearate plus 0.5 wt. percent as follows: | | |
| a. Talc | Generally releases during more than 15 consecutive cycles | Smooth surface, no warpage. |
| b. Magnesium | do | Do. |
| c. Calcium tartrate | do | Do. |
| d. Calcium tartrate | do | Do. |
| e. Lithium stearate | do | Do. |
| f. Aluminum stearate | do | Do. |
| g. Lithium palmitate | do | Do. |
| 2. 0.5 wt. percent n-butyl stearate plus 0.5 wt. percent as follows: | | |
| a. Titanium dioxide | do | Do. |
| b. Magnesium oxide | do | Do. |
| c. Sodium sulfate | do | Do. |
| d. Zinc salicylate | do | Do. |
| e. Lithium stearate | do | Do. |
| f. Zinc stearate | do | Do. |
| g. Sodium laurate | do | Do. |
| h. Magnesium silicate | do | Do. |
| 3. 0.5 wt. percent n-decyl stearate plus 0.5 wt. percent as follows: | | |
| a. Asbestos | do | Do. |
| b. Aluminum sulfate | do | Do. |
| c. Calcium benzoate | do | Do. |
| d. Zinc salicylate | do | Do. |
| e. Calcium phosphate | do | Do. |
| f. Calcium stearate | do | Do. |
| g. Aluminum behenate | do | Do. |
| 4. 0.5 wt. percent isobutyl stearate plus 0.5 wt. percent as follows: | | |
| a. Asbestos | do | Do. |
| b. Talc | do | Do. |
| c. Lithium stearate | do | Do. |
| d. Sodium stearate | do | Do. |
| e. Calcium laurate | do | Do. |
| f. Lithium palmitate | do | Do. |
| 5. 0.5 wt. percent pentaerythritol tetrastearate plus 0.5 wt. percent as follows: | | |
| a. Titanium dioxide | do | Do. |
| b. Magnesium sulfate | do | Do. |
| c. Sodium benzoate | do | Do. |
| d. Zinc salicylate | do | Do. |
| e. Calcium tartrate | do | Do. |
| f. Calcium phosphate | do | Do. |
| g. Lithium stearate | do | Do. |
| h. Sodium stearate | do | Do. |
| i. Aluminum behenate | do | Do. |

TABLE 5.—Continued

| Additive | Mold release | Bar appearance |
|---|---|---|
| 6. 0.5 wt. percent neopentylglycol distearate plus 0.5 wt. percent as follows: | | |
| a. Zinc stearate | do | Do. |
| b. Sodium laurate | do | Do. |
| c. Calcium stearate | do | Do. |
| d. Lithium palmitate | do | Do. |
| e. Talc | do | Do. |
| f. Asbestos | do | Do. |
| 7. 0.5 wt. percent 1,1,1-trimethylolethane tristearate plus 0.5 wt. percent as follows: | | |
| a. Magnesium oxide | do | Do. |
| b. Sodium sulfate | do | Do. |
| c. Aluminum sulfate | do | Do. |
| d. Calcium benzoate | do | Do. |
| e. Magnesium silicate | do | Do. |
| f. Sodium stearate | do | Do. |
| 8. 0.5 wt. percent n-butyl laurate plus 0.5 wt. percent as follows: | | |
| a. Titanium dioxide | do | Do. |
| b. Sodium sulfate | do | Do. |
| c. Lithium stearate | do | Do. |
| d. Sodium laurate | do | Do. |
| e. Aluminum stearate | do | Do. |
| f. Calcium stearate | do | Do. |
| 9. 0.5 wt. percent methyl behenate plus 0.5 wt. percent as follows: | | |
| a. Aluminum behenate | do | Do. |
| b. Sodium stearate | do | Do. |
| c. Zinc stearate | do | Do. |
| 10. 0.5 wt. percent pentaerythritol tetrapalmitate plus 0.5 wt. percent as follows: | | |
| a. Sodium stearate | do | Do. |
| b. Lithium palmitate | do | Do. |
| c. Aluminum behenate | do | Do. |

From Table 6 it is observed that the illustrated synergistic combinations give both good mold release and undistorted tensile bars having smooth, uniformly glossy surfaces.

EXAMPLE 13

Using the exact procedure of Example 1 except that the cycle time is 45 seconds, tensile bars of poly(ethylene terephthalate) having an inherent viscosity of 1.10 blended with 0.5 weight percent pentaerythritol tetrastearate and 0.5 weight percent sodium stearate are molded continuously without sticking or distortion for generally in excess of 40 consecutive cycles. The surfaces are smooth and have uniform gloss.

EXAMPLE 14

Poly(ethylene terephthalate) with an inherent viscosity of 0.85 is extruder blended with 1 weight percent methyl stearate and 1 weight percent lithium stearate and molded into tensile bars following the exact procedure of Example 1 except that a 48 second mold cycle is used. Continuous cycles are possible for at least 40 consecutive cycles. There is essentially no tensile bar distortion or sticking, and the surfaces are smooth and uniformly glossy.

EXAMPLE 15

Poly(1,4-cyclohexanedimethylene terephthalate) with an inherent viscosity of 0.82 is melt blended with 0.5 weight percent calcium stearate and 0.5 weight percent pentaerythritol tetrastearate and injection molded into tensile bars using the exact procedure of Example 5 except that the cycle time is 51 seconds. No sticking of the bars occurs and they are white, free from warpage, smooth and have uniform surface gloss.

EXAMPLE 16

Example 15 is repeated except 0.5 weight percent aluminum behenate and 0.8 weight percent methyl behenate are used as additives. Bars eject continuously and are free from distortion and the surface is very smooth and has uniform gloss.

EXAMPLE 17

Poly(1,4 - cyclohexanedimethylene—83% terephthalate—17% isophthalate) and having an inherent viscosity of 1.49 is extruder blended with 0.3 weight percent sodium stearate and 1.0 weight percent pentaerythritol tetrastearate and molded into tensile bars using the exact procedure of Example 5 except that the melt temperature is adjusted to 290° C. and the molding cycle is 55 seconds. Continuous ejection without sticking of undistorted tensile bars with smooth surfaces having uniform gloss is obtained.

EXAMPLE 18

The additives listed in Table 7 are dry blended to a 1.0 weight percent level with poly(ethylene terephthalate) having an inherent viscosity of 0.61. Pellets are formed from this composition by extrusion at 270° C. in rod form into a water bath maintained at a temperature of 23° C., after which the rods are chopped into pellets which are dried under vacuum at 150° C. for six hours. These pellets are again extruded at a melt temperature of 285° C. through a crosshead extruder to coat the polymer onto a continuous glass fiber (silane sized) roving of 60 ends, 204 filaments per end. The polymer coated roving is passed through a 23° C. water bath and then chopped into glass filled pellets ⅜ inch long. These pellets contain 20 weight percent glass fiber, based on total weight of the admixture, the remainder being poly(ethylene terephthalate) having an inherent viscosity of 0.55 and additives. This mixture is dried for six hours under vacuum at 150° C. and then injection molded to form salad bowls on a 24-ounce reciprocating screw machine, the cylinder temperatures of which are adjusted to give a melt temperature of 280° C. at the nozzle. The mold temperature is maintained at 148° C. and the mold cycle is 50 seconds. The salad bowl is 9⅛" in diameter, 3⅛" high, and has a ⅜" rim forming a circle 5½" in diameter as a base.

A three step evaluation of the additive is carried out. First, mold release is rated 1, 2 or 3 where 1 represents essentially continuous operation without spraying the mold surface with a silicone mold release agent. A 2 rating indicates that 10 to 25 cycles can be run before the bowl sticks. A 3 rating indicates less than 10 cycles can be made between sprayings of the mold with lubricant. Second, the rim at the base of the salad bowl is evaluated for surface roughness. An estimate of the percent of the rim surface which is rough is made. Third, the inside of the bowl is examined to determine the uniformity of gloss of the surface. A surface with practically no dull streaks is rated 1; a few streaks, 2; considerably streaked, 3; and excessive amount of surface streaks, 4.

TABLE 7

| Sample: | Additive | Mold release rating | Surface Appearance percent roughness | Gloss rating |
|---|---|---|---|---|
| 1 | None (Control) | 3 | 95 | 4 |
| 2 | Talc | 3 | 10 | 4 |
| 3 | Asbestos | 3 | 10 | 4 |
| 4 | Titanium dioxide | 3 | 15 | 4 |
| 5 | Magnesium oxide | 3 | 25 | 4 |
| 6 | Magnesium sulfate | 3 | 25 | 4 |
| 7 | Sodium sulfate | 3 | 35 | 4 |
| 8 | Aluminum sulfate | 3 | 30 | 3 |
| 9 | Calcium benzoate | 3 | 20 | 4 |
| 10 | Magnesium silicate | 3 | 15 | 3 |
| 11 | Zinc salicylate | 3 | 25 | 4 |
| 12 | Calcium tartrate | 3 | 30 | 4 |
| 13 | Calcium phosphate | 3 | 15 | 4 |
| 14 | Lithium stearate | 2 | 10 | 2 |
| 15 | Sodium stearate | 2 | 10 | 2 |
| 16 | Calcium stearate | 2 | 10 | 2 |
| 17 | Aluminum stearate | 2 | 15 | 3 |
| 18 | Sodium laurate | 2 | 10 | 2 |
| 19 | Lithium palmitate | 2 | 15 | 3 |
| 20 | Aluminum behenate | 2 | 10 | 2 |
| 21 | Zinc stearate | 2 | 20 | 2 |
| 22 | Methyl stearate | 1 | 50 | 4 |
| 23 | n-Butyl stearate | 1 | 50 | 4 |
| 24 | n-Decyl stearate | 1 | 50 | 4 |
| 25 | Isobutyl stearate | 1 | 50 | 4 |
| 26 | Pentaerythritol tetrastearate | 1 | 25 | 1 |
| 27 | Neopentylglycol distearate | 1 | 25 | 2 |
| 28 | 1,1,1-trimethylolethane tristearate | 1 | 25 | 3 |
| 29 | n-Butyl laurate | 1 | 40 | 4 |
| 30 | Methyl behenate | 1 | 35 | 4 |
| 31 | Pentaerythritol tetrapalmitate | 1 | 25 | 2 |
| 32 | Di-2-ethylhexyl phthalate | 3 | 80 | 4 |
| 33 | Triphenyl phosphate | 3 | 50 | 4 |

Additives of Samples 2–13, 32 and 33 are shown to give little or no release improvement over the control. In addition even though most reduce the surface roughness, the level in most cases is still unsatisfactory. Finally, the uniformity of surface gloss is not substantially improved. The additives of Sample Nos. 14–21 definitely reduce surface roughness and improve mold release; however, these additives do not yield continuous mold release and uniformity of gloss is poor. The additives of Sample Nos. 22–31 do give continuous release but the surfaces are generally rough and in most cases dull streaks are very noticeable.

EXAMPLE 19

The exact procedure of Example 18 is repeated except the additives are the synergistic combinations listed in Table 8. An evaluation of the additives on the basis of the numerical scale explained in Example 18 is carried out with the results shown in Table 8.

TABLE 8

| Sample | Additive | Mold release rating | Surface appearance Percent roughness | Gloss rating |
|---|---|---|---|---|
| 1 | 0.5 wt. percent methyl stearate plus 0.5 wt. percent as follows: | | | |
| | a. Talc | 1 | 5 | 2 |
| | b. Magnesium sulfate | 1 | 10 | 2 |
| | c. Sodium benzoate | 1 | 10 | 2 |
| | d. Calcium tartrate | 1 | 10 | 2 |
| | e. Lithium stearate | 1 | 5 | 1 |
| | f. Aluminum stearate | 1 | 5 | 2 |
| | g. Lithium palmitate | 1 | 5 | 1 |
| 2 | 0.5 wt. percent n-butyl stearate plus 0.5 wt. percent as follows: | | | |
| | a. Titanium dioxide | 1 | 10 | 2 |
| | b. Magnesium oxide | 1 | 10 | 2 |
| | c. Sodium sulfate | 1 | 15 | 2 |
| | d. Zinc salicylate | 1 | 20 | 2 |
| | e. Lithium stearate | 1 | 5 | 1 |
| | f. Zinc stearate | 1 | 5 | 1 |
| | g. Sodium laurate | 1 | 10 | 1 |
| | h. Magnesium silicate | 1 | 15 | 2 |
| 3 | 0.5 wt. percent n-decyl stearate plus 0.5 wt. percent as follows: | | | |
| | a. Asbestos | 1 | 10 | 2 |
| | b. Aluminum sulfate | 1 | 15 | 2 |
| | c. Calcium benzoate | 1 | 10 | 2 |
| | d. Zinc salicylate | 1 | 15 | 2 |
| | e. Calcium phosphate | 1 | 10 | 2 |
| | f. Calcium stearate | 1 | 5 | 1 |
| | g. Aluminum behenate | 1 | 10 | 1 |
| | h. Carbon black | 1 | 5 | 2 |
| 4 | 0.5 wt. percent isobutyl stearate plus 0.5 wt. percent as follows: | | | |
| | a. Asbestos | 1 | 15 | 2 |
| | b. Talc | 1 | 5 | 2 |
| | c. Lithium stearate | 1 | 5 | 1 |
| | d. Sodium stearate | 1 | 0 | 1 |
| | e. Calcium laurate | 1 | 10 | 2 |
| | f. Lithium palmitate | 1 | 5 | 2 |
| 5 | 0.5 wt. percent pentaerythritol tetrastearate plus 0.5 wt. percent as follows: | | | |
| | a. Titanium dioxide | 1 | 10 | 1 |
| | b. Magnesium sulfate | 1 | 10 | 2 |
| | c. Zinc salicylate | 1 | 15 | 2 |
| | d. Calcium tartrate | 1 | 15 | 2 |
| | e. Calcium phosphate | 1 | 20 | 2 |
| | f. Lithium stearate | 1 | 0 | 1 |
| | g. Sodium stearate | 1 | 0 | 1 |
| | h. Aluminum behenate | 1 | 5 | 2 |
| 6 | 0.5 wt. percent neopentyl glycol distearate plus 0.5 wt. percent as follows: | | | |
| | a. Zinc stearate | 1 | 5 | 1 |
| | b. Sodium laurate | 1 | 10 | 1 |
| | c. Calcium stearate | 1 | 5 | 2 |
| | d. Lithium palmitate | 1 | 10 | 2 |
| | e. Talc | 1 | 5 | 2 |
| | f. Asbestos | 1 | 5 | 2 |
| 7 | 0.5 wt. percent 1,1,1-trimethylolethane tristearate plus 0.5 wt. percent as follows: | | | |
| | a. Magnesium oxide | 1 | 15 | 2 |
| | b. Sodium sulfate | 1 | 15 | 2 |
| | c. Aluminum sulfate | 1 | 20 | 2 |
| | d. Calcium benzoate | 1 | 15 | 2 |
| | e. Magnesium silicate | 1 | 10 | 2 |
| | f. Sodium stearate | 1 | 10 | 2 |
| 8 | 0.5 wt. percent n-butyl laurate plus 0.5 wt. percent as follows: | | | |
| | a. Titanium dioxide | 1 | 10 | 2 |
| | b. Sodium sulfate | 1 | 15 | 2 |
| | c. Lithium stearate | 1 | 5 | 1 |
| | d. Sodium laurate | 1 | 10 | 1 |
| | e. Aluminum stearate | 1 | 10 | 2 |
| | f. Calcium stearate | 1 | 5 | 2 |
| 9 | 0.5 wt. percent methyl behenate plus 0.5 wt. percent as follows: | | | |
| | a. Aluminum behenate | 1 | 10 | 1 |
| | b. Sodium stearate | 1 | 5 | 1 |
| | c. Zinc stearate | 1 | 5 | 2 |
| 10 | 0.5 wt. percent pentaerythritol tetrapalmitate plus 0.5 wt. percent as follows: | | | |
| | a. Sodium stearate | 1 | 0 | 1 |
| | b. Lithium palmitate | 1 | 5 | 1 |
| | c. Aluminum behenate | 1 | 10 | 2 |

In comparison with Table 7, Table 8 show the unexpected results when a synergistic combination of materials is added. In all cases, mold release is excellent. In general, the surface roughness on the bowl rim is reduced to low or zero values, and few, if any, streaks mar the bowl's glossy surface. The combined result of good release and good surface properties obtained with the synergistic combination is unexpectedly unique.

The composition of Sample 5g of Table 8 (0.5 weight percent pentaerythritol tetrastearate and 0.5 weight percent sodium stearate) is tested for tensile strength and is compared to the tensile strength of a sample not containing the additive. By ASTM D638 method the tensile strength without the combination is 20,100 pounds per square inch and with the combination is 20,300 p.s.i. Thus, it is seen that the tensile strength of the polymer is not significantly affected by the addition of the synergistic combination.

EXAMPLE 20

Using the composition of Sample 5g of Table 8 the exact procedure of Example 19 was followed except the weight percent was changed to 10% and 35% of glass fiber based on the total weight of the admixture. An evaluation on the basis of that described in Example 18 shows the results tabulated in Table 9.

TABLE 9

| Glass concentration | Mold release | Surface Appearance | |
|---|---|---|---|
| | | Percent roughness | Gloss rating |
| 10 wt. percent | 1 | 0 | 1 |
| 30 wt. percent | 1 | 0 | 1 |

Excellent release and surface are obtained with no indication of glass concentration influence.

EXAMPLE 21

Pellets of poly(ethylene terephthalate) having an inherent viscosity of 0.95 and containing 0.7 weight percent potassium stearate and 1.0 weight percent pentaerythritol tetrastearate are prepared by extrusion at 270° C. in rod-like form into a 23° C. water bath as described in Example 1. These pellets are then tumbled with ⅛ inch long chopped strand glass fiber with a chrome size, the glass fibers being present at a level of 20 weight percent based on the total weight of the admixture. After being dried at 150° C. for 6 hours under vacuum, the pellets and fibers are fed to a 24-ounce reciprocating screw injection molding machine and formed into the salad bowl described in Example 18. The melt temperature at the nozzle is 280° C., the mold temperature is 148° C. and the mold cycle is 50 seconds. On the basis of the rating system described in Example 18, the additives received a release rating of 1, roughness of 5%, and gloss rating of 1.

EXAMPLE 22

Pellets are formed of poly(ethylene terephthalate) having an inherent viscosity of 0.58 by first dry blending with calcium stearate to a 0.2 weight percent level, methyl stearate to a 0.4 weight percent level, and 1/32 inch milled glass fibers are admixed so that total admixture contains 30% by weight thereof. These fibers are obtained by using a hammer mill and a screen having a mesh size of 1/32 inch whereby fibers are reduced to a size which passes through the screen. Next, this admixture is extruded at a melt temperature of 270° C. as a rod into a bath of water maintained at a temperature of 23° C. Pellets suitable for molding are chopped or granulated from the rod and dried under vacuum at 150° C. for six hours. The pellets are molded into a salad bowl under the conditions given in Example 18 and evaluated on the rating basis described in Example 18. Mold release rates 1, surface 10%, roughness and surface gloss rates 2. In addition, a sample of this material is compression molded on a flat bed press at 280° C. in a 4″ x 6″ x ⅛″ template at a force of 12 tons on a 2 inch diameter ram. The mold is maintained at a temperature of 280° C. for 3 minutes and then cooled to 140° C. and held at this temperature for 1 minute. The resulting article is a crystallized plaque which releases easily from the mold and has a smooth, high gloss surface having essentially no streaks.

EXAMPLE 23

The exact procedure of Example 19 is repeated with the composition of Sample 5g, Table 8 except that tensile bars are molded on a 6-ounce, reciprocating screw machine at a melt temperature of 275° C., a mold temperature of 5° C., and a cycle time of 32 seconds. No sticking of bars in the mold is observed and the material of the bars is amorphous with a slight amber color and a smooth surface.

EXAMPLE 24

Poly(1,4-cyclohexanedimethylene terephthalate) having an inherent viscosity of 0.83 is dry blended with sodium stearate to a 0.5 weight percent level and with pentaerythritol tetrastearate to a 0.5 weight percent level. The composition is melt extruded at 306° C. as a rod into a bath of water maintained at a temperature of 23° C. Pellets suitable for molding are chopped or granulated from the rod and dried under vacuum at 150° C. for six hours. The dried pellets are tumble blended with silane sized glass fiber strands ¼ inch long to a 25 weight percent level based on the total admixture. The blend is injection molded to form a salad bowl as described in Example 18 in a 24-ounce reciprocating screw machine at a melt temperature of 303° C., a mold temperature of 149° C., and a cycle time of 55 seconds. The additives are evaluated in accordance with the rating basis described in Example 18. Mold release is rated 1, surface roughness 5%, and surface gloss 2.

EXAMPLE 25

Poly(1,4 - cyclohexanedimethylene 90% — terephthalate—10%—isophthalate) having an inherent viscosity of 1.6 is dry blended with lithium stearate to a 0.7 weight percent level and with methyl stearate to a 0.9 weight percent level. The composition is melt extruded at 295° C. as a rod into a bath of water maintained at a temperature of 23° C. Pellets suitable for molding are chopped or granulated from the rod and dried under vacuum at 150° C. for six hours. The dried pellets are tumble blended with silane sized, chopped glass fiber strands ⅛ inch long to a 20 weight percent level based on the total weight of the admixture. The blend is injection molded to form a salad bowl as described in Example 18 in a 24-ounce reciprocating screw machine at a melt temperature of 295° C., a mold temperature of 149° C., and a cycle time of 50 seconds. The additives are evaluated in accordance with the rating basis described in Example 18. Mold release is rated 1, surface roughness 5% and surface gloss 1.

The invention has been described in detail with particular reference to preferred embodiments thereof but it will be understood that variations and modifications can be effected within the spirit and scope of the invention as described hereinabove and as defined in the appended claims.

We claim:
1. A thermoplastic polyester composition comprising a linear polyester selected from the group consisting of polyethylene terephthalate, poly-(1,4-butylene terephthalate), and poly(1,4 - cyclohexanedimethylene tereph - thalate), said polyester having a melting point above about 150° C. and a second order transition temperature above about 0° C., from about 0.1 to about 3.0% by weight, based on the polyester content, of an ester of an organic acid of from 9 to 25 carbons and an alcohol of from 1 to 10 carbons, said ester containing no residual functionality, and from about 0.1 to about 3% by weight, based on the polyester content, of a synergistic agent selected from the group consisting of:

(a) alkali metal salts and alkaline earth metal salts of an organic acid essentially composed of a hydrocarbon group containing from about 9 to about 25 carbon atoms and a carboxyl group attached to an adjacent carbon atom which is attached to four other atoms,
    (b) talc, and
    (c) asbestos.

2. Thermoplastic composition of claim 1 wherein said ester is methyl stearate and said synergistic agent is sodium stearate.

3. Thermoplastic composition of claim 1 wherein said ester is pentaerythritol tetrastearate and said synergistic agent is sodium stearate.

4. Thermoplastic composition of claim 1 wherein said composition is uniformly admixed with up to about 50% by weight, based on the weight of the admixture, of glass fibers having fiber lengths in the range between about 0.4 and about 20 mm.

5. Molded article of thermoplastic composition of claim 1.

6. Molded article of thermoplastic composition of claim 1, the surface of said article being substantially smooth and having a uniform gloss due to the presence of said synergistic agent.

7. Molded article of thermoplastic composition of claim 1 in which said polyester is substantially amorphous.

8. Molded article of thermoplastic composition of claim 1 in which said polyester is substantially crystalline.

9. Molded article of thermoplastic composition of claim 4.

10. Molded article of thermoplastic composition of claim 1 in which said polyester is substantially crystalline.

References Cited

UNITED STATES PATENTS

| | | | |
|---|---|---|---|
| 2,128,534 | 8/1938 | Howald | 264—130 |
| 2,357,833 | 9/1944 | Kropscott et al. | 106—182 |
| 2,532,245 | 11/1950 | Serdynsky | 260—23 |
| 2,649,622 | 8/1953 | Piccard | 264—126 |
| 2,877,501 | 3/1959 | Bradt | 264—143 |
| 2,809,946 | 10/1957 | Blegen et al. | 260—22 |
| 3,368,995 | 2/1968 | Furukawa et al. | 260—40 |

DONALD E. CZAJA, Primary Examiner

R. W. GRIFFIN, Assistant Examiner

U.S. Cl. X.R.

260—31.6; 31.8, 40, 75; 264—300, 328, 329